United States Patent
Miura

(10) Patent No.: US 8,035,474 B2
(45) Date of Patent: Oct. 11, 2011

(54) SEMI-CONDUCTIVE CERAMIC MATERIAL AND NTC THERMISTOR USING THE SAME

(75) Inventor: Tadamasa Miura, Yasu (JP)

(73) Assignee: Murata Manufacturing Co., Ltd., Nagaokakyo-shi, Kyoto-fu (JP)

(*) Notice: Subject to any disclaimer, the term of this patent is extended or adjusted under 35 U.S.C. 154(b) by 0 days.

(21) Appl. No.: 12/707,049

(22) Filed: Feb. 17, 2010

(65) Prior Publication Data

US 2010/0134237 A1 Jun. 3, 2010

Related U.S. Application Data

(63) Continuation of application No. PCT/JP2008/064093, filed on Aug. 6, 2008.

(30) Foreign Application Priority Data

Aug. 22, 2007 (JP) .................. 2007-215417

(51) Int. Cl.
*H01C 7/10* (2006.01)
(52) U.S. Cl. .................................... 338/22 R
(58) Field of Classification Search .............. 338/20–21, 338/22 R
See application file for complete search history.

(56) References Cited

U.S. PATENT DOCUMENTS

| | | | |
|---|---|---|---|
| 6,432,474 B1 | 8/2002 | Nakanishi et al. | |
| 6,469,612 B2 | 10/2002 | Nakayama et al. | |
| 2007/0262408 A1 | 11/2007 | Takagi et al. | |
| 2008/0311428 A1* | 12/2008 | Mori et al. ................. | 428/701 |

FOREIGN PATENT DOCUMENTS

| | | |
|---|---|---|
| JP | 02-189901 | 7/1990 |
| JP | 09-233686 | 9/1997 |
| JP | 2000-095522 A | 4/2000 |
| JP | 2000-138103 | 5/2000 |
| JP | 2002-121071 | 4/2002 |
| JP | 2002-231508 | 8/2002 |
| JP | 2003-257706 A | 9/2003 |
| JP | 2003-272904 | 9/2003 |
| JP | 2005-268578 | 9/2005 |
| JP | 2006-278478 A | 10/2006 |
| JP | 2006-339395 | 12/2006 |
| WO | WO-2007/037332 A1 | 4/2007 |

OTHER PUBLICATIONS

Written Opinion of the International Searching Authority for PCT/JP2008/064093, date of mailing Oct. 7, 2008.
International Search Report for PCT/JP2008/064093, date of mailing Oct. 7, 2008.

* cited by examiner

*Primary Examiner* — Kyung Lee
(74) *Attorney, Agent, or Firm* — Dickstein Shapiro LLP

(57) ABSTRACT

A NTC thermistor which has superior linearity of resistance-temperature characteristic is provided without depending on a combination of two or more kinds of material but with a single semi-conductive ceramic material. As the semi-conductive ceramic material of negative resistance-temperature characteristic is a ceramic body constituting a NTC thermistor being an oxide expressed by the formula $AMn_yO_z$ in which y is 0.8 to 1.6, A is a combination of rare earth element and barium and the content of barium in A is 60 to 75 mol % when y=0.8 to 1.5, and 50 to 63 mol % y=1.7 to 2.3, and z is a value which maintains the electric neutrality of the oxide. A preferable oxide is of the formula $(La_{1-\alpha}Ba_\alpha)Mn_yO_z$ in which when y=0.8 to 1.5, $0.60 \leq \alpha \leq 0.75$, and when y=1.7 to 2.3, $0.50 \leq \alpha \leq 0.63$.

8 Claims, 1 Drawing Sheet

US 8,035,474 B2

SEMI-CONDUCTIVE CERAMIC MATERIAL AND NTC THERMISTOR USING THE SAME

This is a continuation of application Ser. No. PCT/JP2008/064093, file Aug. 6, 2008, which is hereby incorporated herein by reference.

TECHNICAL FIELD

The present invention relates to a semi-conductive ceramic material having a negative resistance-temperature characteristic and an NTC thermistor produced with the material, providing a technology improving the linearity of resistance-temperature characteristic of the thermistor.

BACKGROUND ART

NTC thermistors are thermistors which have a negative resistance-temperature coefficient, that is, NTC thermistors have relatively high resistance at room temperature which decreases as the temperature is increased. Therefore, NTC thermistors are used as a temperature sensor or in a temperature compensation circuit, for example.

Generally, the resistance-temperature characteristic of an NTC thermistor is not linear. When an NTC thermistor is utilized as the above described temperature sensor or in a temperature compensation circuit, a more linear resistance-temperature characteristic is preferred so that the response to small temperature changes is linear. The conventional method of obtaining a preferred resistance-temperature characteristic by using a fixed resistor or an IC device, for example, in the circuit in which an NTC thermistor is adopted is well known. However, that method requires a complicated circuit and results in higher cost.

Japanese Unexamined Patent Application Publication No. 2003-272904 (Patent Document 1) discloses an NTC thermistor having a linearized resistance-temperature characteristic by laminating two kinds of NTC thermistor materials in one body. Japanese Unexamined Patent Application Publication No. 2002-231508 (Patent Document 2) and Japanese Unexamined Patent Application Publication No. 2-189901 (Patent Document 3) disclose a similar method. In the Patent Document 2, a thermistor having linear resistance-temperature characteristics over a wide temperature range by uniting a first and a second thermistor which are different from each other in the characteristic into one body so as to be equivalent in parallel without causing reaction therebetween is disclosed. In the Patent Document 3, an NTC thermistor of linearized resistance-temperature characteristic by laminating and forming one body with two or more kinds of resistor layers which have different resistance-temperature characteristics is disclosed.

All of the methods disclosed in the Patent Documents 1 to 3 is conceived to obtain a linearized resistance-temperature characteristic by laminating or uniting ceramic layers of at least two kinds of thermistor material which have a different negative resistance-temperature characteristic each other.

According to the method disclosed in the Patent Documents 1 to 3, problems exists in that at least two kinds of thermistor material must be prepared and, furthermore, selecting material which make a linearized resistance-temperature characteristic is difficult. Moreover, since ceramic layers composed of at least two kinds of thermistor material are united, undesired characteristic change or cracking due to a weak united interface tends to occur from elemental diffusion, a difference of contraction percentage or a difference of linear coefficient of expansion, for example, at firing.

Patent Document 1: Japanese Unexamined Patent Application Publication No. 2003-272904
Patent Document 2: Japanese Unexamined Patent Application Publication No. 2002-231508
Patent Document 3: Japanese Unexamined Patent Application Publication No. 2-189901

DISCLOSURE OF INVENTION

Problems to be Solved by the Invention

It is an object of the present invention to provide a semi-conductive ceramic material and an NTC thermistor composed of the material which have a linearized negative resistance-temperature characteristic by themselves and combination of at least two kinds of material is not necessary.

Means for Solving the Problems

The present invention is characterized by that a semi-conductive ceramic material is composed of an oxide which is expressed by general formula $A_xB_yO_z$ (in this formula z is determined by valencies of the elements of A and B and amounts of x and y, and that keeps electric neutrality of the ceramic); wherein A includes rare earth element and barium, and B includes manganese; having a negative resistance-temperature characteristic; and when x=1 and y=0.8 to 1.5, the content of the barium element in A is 60 to 75 mol %, and when x=1 and y=1.7 to 2.3, the content of the barium element in A is 50 to 63 mol % so that above described problem is solved.

As a semi-conductive ceramic material of this invention, preferably when x=1 and y=0.8 to 1.5, the content of the barium element in A is 69 to 72 mol %, and when x=1 and y=2.0 to 2.1, the content of the barium element in A is 54 to 63%.

Above described oxide expressed by $A_xB_yO_z$ is more specifically expressed by $(La_{1-\alpha}Ba_\alpha)_xMn_yO_z$ (z is determined by the amounts of x and y, and keeps electric neutrality of the ceramic). In this case, when x=1 and y=0.8 to 1.5, $0.60 \leq \alpha \leq 0.75$, and when x=1 and y=1.7 to 2.3 $0.50 \leq \alpha \leq 0.63$.

This invention is utilized for an NTC thermistor which includes a ceramic body and electrodes facing each other and sandwich at least a part of the ceramic body. The NTC thermistor of the present invention is characterized by that above described ceramic body is composed of semi-conductive ceramic material according to this invention.

ADVANTAGES

With a semi-conductive ceramic material according to the present invention, a linearized negative resistance-temperature characteristic is achieved by itself. Accordingly, a NTC thermistor having linearized resistance-temperature characteristic can be provided easily.

In the semi-conductive ceramic material according to the present invention, by limiting the barium content of A in $A_xB_yO_z$ as 69 to 72 mol % when x=1 and y=0.8 to 1.5, and as 54 to 63 mol % when x=1 and y=2.0 to 2.1, a more linearized resistance-temperature characteristic is achieved.

Since the NTC thermistor according to the present invention is composed of a single semi-conductive ceramic material, unlike being composed with two or more kinds of ceramic layers, characteristic change during firing, cracks due to a difference of the linear coefficients of expansion, and so forth can be avoided. In addition, since the NTC thermistor according to the present invention has a linearized resistance-temperature characteristic by itself, adjusting resistance-temperature characteristic by providing an IC device or a resistor in a circuit is not required.

REFERENCE NUMERALS

1 ... NTC thermistor
11, 12 ... Electrode
20 ... Ceramic body

BEST MODE FOR CARRYING OUT THE INVENTION

Figure 1:
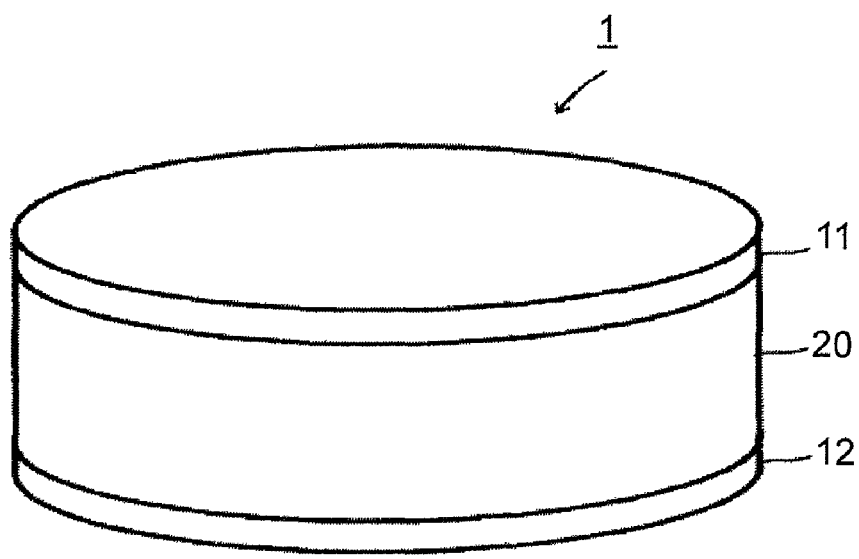
FIG. 1 is a perspective view illustrating an NTC thermistor 1 in accordance with a preferred embodiment of the present invention.

FIG. 1 is a perspective view illustrating an NTC thermistor 1 in accordance with an embodiment of the present invention.

The NTC thermistor includes electrodes 11 and 12 and a ceramic body 20 sandwiched between the electrodes 11 and 12. The electrodes 11 and 12 can be composed of Ag, Ag—Pd, Pd, Pt, or Au, or alloy including these metals. The ceramic body is composed of a semi-conductive ceramic material in accordance with the present invention.

Although FIG. 1 shows a disc shape NTC thermistor 1, a rectangular block shape may be used. A multilayer configuration with internal electrodes may be used as well.

The semi-conductive ceramic material which constitutes the ceramic body has a negative resistance-temperature characteristic and is composed of an oxide which is expressed by general formula $A_xB_yO_z$ (where z is determined by valencies of the elements of A and B and amounts of x and y, and keeps electric neutrality of the ceramic), wherein A includes a rare earth element and barium, and B includes manganese. Herein, the barium content in A in $A_xB_yO_z$ is 60 to 75 mol % when x=1 and y=0.8 to 1.5, and is 50 to 63 mol % when x=1 and y=1.7 to 2.3. Similar advantages can be achieved even when z value is slightly varied by oxygen escape, for example.

By choosing composition of the semi-conductive ceramic material for the ceramic body 20 as described above, the resistance-temperature characteristic of the NTC thermistor 1 can become linear.

In the semi-conductive ceramic material for the ceramic body 20, by limiting the barium content in A as 69 to 72 mol % when x=1 and y=0.8 to 1.5, and as 54 to 63 mol % when x=1 and y=2.0 to 2.1, a more linearized resistance-temperature characteristic is achieved and sensitivity to temperature change is increased as well.

As more specific embodiment of the semi-conductive ceramic material for the ceramic body 20, an oxide expressed by $(La_{1-\alpha}Ba_\alpha)_xMn_yO_z$ (where z is determined by amounts of x and y, and that keeps electric neutrality of the ceramic) is utilized. Herein, when x=1 and y=0.8 to 1.5, $0.60 \leq \alpha \leq 0.75$, and when x=1 and y=1.7 to 2.3, $0.50 \leq \alpha \leq 0.63$.

In order to confirm the advantages according to the present invention, the following experiment was performed as described below.

Powdered starting materials, $La_2O_3$, $BaCO_3$ and $Mn_3O_4$, were prepared. These starting materials were weighed and mixed so that the compositions shown in Tables 1 were produced after firing. Then a polycarboxylic acid dispersant and pure water were added to the weighed materials, and the materials were pulverized and mixed together with $ZrO_2$ balls in a ball mill, and were dried and calcined at 900° C. for 2 hours. Calcined powders were obtained by pulverizing again in the ball mill.

Then, for 100 weight parts of the calcined powders, 40 weight parts of water and 2.0 weight parts of a poly-carboxylic acid dispersant were added and mixed for 24 hours. Next, 25 weight parts of acrylic organic binder and 0.75 weight parts of polyoxyethylene as a plasticizer were added thereafter and mixed for 2 hours, whereby a ceramic slurry was obtained.

The resulting slurry was formed into sheets by the doctor blade method, and thereafter dried to obtain green sheets having a thickness of about 40 μm. Then, the green sheets were laminated, pressed, and cut into a rectangular block shape so that the ceramic body after firing has a size of 1.6 mm×1.6 mm×0.5 mm. Then, the rectangular block body of the pressed ceramic green sheets was degreased at 350° C. in the air for 10 hours, and subsequently fired at 1200° C. for 2 hours, whereby a sintered ceramic body was obtained.

Then, the electrodes were provided by applying a conductive paste containing Ag on both main surfaces of the ceramic body and baking it at 800° C. With this method samples No. 1 to 96 of the NTC thermistor were prepared.

Meanwhile, samples of NTC thermistor No. 101 to 103 were prepared with the same method as described above except $BaCO_3$ was replaced by $SrCO_3$ as the staring material. Samples of NTC thermistor No. 104 to 109 were prepared with the same method as described above except $BaCO_3$ was replaced by $CaCO_3$ as the starting material, as well.

Then $B_{25/50}$, which is the resistance-temperature coefficient between 25° C. and 50° C., and $R^2$, which is the linearity coefficient of the resistance-temperature characteristic, were measured on the samples of NTC thermistor No. 1 to 96, No. 101 to 103 and No. 104 to 109.

The resistance-temperature coefficient $B_{25/50}$ is calculated by equation 1 below. $B_{25/50}$ indicates sensitivity of the resistance change to a temperature change. That is, a larger of $B_{25/50}$ indicates a larger sensitivity.

$$B_{25/50} = \frac{\ln(R_{25}) - \ln(R_{50})}{1/298.15 - 1/323.15} \qquad \text{Equation 1}$$

$R_{25}$: Resistance at 25° C.

$R_{50}$: Resistance at 50° C.

The linearity coefficient $R^2$ is calculated by equation 2 below. $R^2$ indicates the linearity of the resistance-temperature characteristic. That is, the closer to 1 in the absolute value of $R^2$ indicates a superior linearity.

$$R^2 = \frac{S(xy)}{\sqrt{S(xx)S(xy)}} \qquad \text{Equation 2}$$

$$S(xx) = \sum (x_i - \bar{x})^2$$

$$S(yy) = \sum (y_i - \bar{y})^2$$

$$S(xy) = \sum (x_i - \bar{x})(y_i - \bar{y})$$

1x: Temperature y: Resistance at temperature x $B_{25/50}$ and $R^2$ obtained in the above manner are shown in tables 1 to 5.

TABLE 1

| Sample No. | La mol | Ba mol | Mn mol | $B_{25/50}$ K | $R^2$ |
|---|---|---|---|---|---|
| 1* | 0.30 | 0.70 | 0.65 | 5523 | 0.293 |
| 2* | 0.30 | 0.70 | 0.75 | 919 | 0.453 |
| 3 | 0.30 | 0.70 | 0.80 | 1005 | 0.992 |
| 4 | 0.30 | 0.70 | 0.82 | 1054 | 0.990 |
| 5 | 0.30 | 0.70 | 0.84 | 1123 | 0.990 |
| 6 | 0.30 | 0.70 | 0.86 | 1050 | 1.000 |
| 7 | 0.30 | 0.70 | 0.88 | 1511 | 0.998 |
| 8 | 0.30 | 0.70 | 0.90 | 1552 | 0.996 |
| 9 | 0.30 | 0.70 | 0.92 | 1493 | 0.996 |
| 10 | 0.30 | 0.70 | 0.94 | 1573 | 0.996 |
| 11 | 0.30 | 0.70 | 0.96 | 1527 | 0.996 |
| 12 | 0.30 | 0.70 | 0.98 | 1428 | 0.998 |
| 13 | 0.30 | 0.70 | 1.00 | 1208 | 0.998 |
| 14 | 0.30 | 0.70 | 1.10 | 1074 | 0.986 |
| 15 | 0.30 | 0.70 | 1.20 | 977 | 0.994 |
| 16 | 0.30 | 0.70 | 1.30 | 989 | 0.996 |
| 17 | 0.30 | 0.70 | 1.40 | 1037 | 0.998 |
| 18 | 0.30 | 0.70 | 1.50 | 1156 | 0.991 |
| 19* | 0.30 | 0.70 | 1.60 | 1246 | 0.974 |
| 20* | 0.50 | 0.50 | 1.00 | 412 | 0.955 |
| 21 | 0.40 | 0.60 | 1.00 | 766 | 0.980 |
| 22 | 0.36 | 0.64 | 1.00 | 945 | 0.993 |
| 23 | 0.33 | 0.67 | 1.00 | 931 | 0.995 |
| 24 | 0.31 | 0.69 | 1.00 | 1050 | 0.999 |
| 25 | 0.30 | 0.70 | 1.00 | 1208 | 0.999 |
| 26 | 0.29 | 0.71 | 1.00 | 1120 | 0.999 |
| 27 | 0.28 | 0.72 | 1.00 | 1110 | 0.999 |
| 28 | 0.27 | 0.73 | 1.00 | 1600 | 0.981 |
| 29* | 0.20 | 0.80 | 1.00 | 2285 | 0.856 |

TABLE 2

| Sample No. | La mol | Ba mol | Mn mol | $B_{25/50}$ K | $R^2$ |
|---|---|---|---|---|---|
| 30* | 0.50 | 0.50 | 0.90 | 677 | 0.979 |
| 31 | 0.40 | 0.60 | 0.90 | 844 | 0.990 |
| 32 | 0.37 | 0.63 | 0.90 | 952 | 0.993 |
| 33 | 0.34 | 0.66 | 0.90 | 1228 | 0.989 |
| 34 | 0.31 | 0.69 | 0.90 | 1358 | 0.995 |
| 35 | 0.30 | 0.70 | 0.90 | 1552 | 0.998 |
| 36 | 0.28 | 0.72 | 0.90 | 1811 | 0.998 |
| 37 | 0.25 | 0.75 | 0.90 | 3831 | 0.981 |
| 38* | 0.22 | 0.78 | 0.90 | 3075 | 0.928 |
| 39* | 0.19 | 0.81 | 0.90 | 2991 | 0.926 |
| 40* | 0.50 | 0.50 | 0.80 | 589 | 0.892 |
| 41 | 0.40 | 0.60 | 0.80 | 955 | 0.987 |
| 42 | 0.37 | 0.63 | 0.80 | 1247 | 0.989 |
| 43 | 0.31 | 0.69 | 0.80 | 1344 | 0.996 |
| 44 | 0.28 | 0.72 | 0.80 | 2170 | 0.991 |
| 45 | 0.25 | 0.75 | 0.80 | 1249 | 0.989 |
| 46* | 0.22 | 0.78 | 0.80 | 1732 | 0.959 |
| 47* | 0.19 | 0.81 | 0.80 | 3004 | 0.918 |
| 48 | 0.35 | 0.65 | 1.10 | 643 | 0.981 |
| 49 | 0.35 | 0.65 | 1.20 | 702 | 0.985 |
| 50 | 0.35 | 0.65 | 1.30 | 822 | 0.988 |
| 51 | 0.35 | 0.65 | 1.40 | 779 | 0.992 |
| 52 | 0.35 | 0.65 | 1.50 | 1005 | 0.983 |
| 53 | 0.25 | 0.75 | 1.00 | 1674 | 0.980 |
| 54 | 0.25 | 0.75 | 1.10 | 1044 | 0.982 |
| 55 | 0.25 | 0.75 | 1.20 | 1122 | 0.985 |
| 56 | 0.25 | 0.75 | 1.30 | 1201 | 0.987 |
| 57 | 0.25 | 0.75 | 1.40 | 1156 | 0.989 |
| 58 | 0.25 | 0.75 | 1.50 | 1302 | 0.983 |

TABLE 3

| Sample No. | La mol | Ba mol | Mn mol | $B_{25/50}$ K | $R^2$ |
|---|---|---|---|---|---|
| 59* | 0.60 | 0.40 | 2.00 | 619 | 0.956 |
| 60 | 0.50 | 0.50 | 2.00 | 657 | 0.980 |
| 61 | 0.46 | 0.54 | 2.00 | 1028 | 0.999 |
| 62 | 0.43 | 0.57 | 2.00 | 1036 | 0.999 |
| 63 | 0.40 | 0.60 | 2.00 | 1135 | 0.993 |
| 64 | 0.37 | 0.63 | 2.00 | 973 | 1.000 |
| 65* | 0.34 | 0.66 | 2.00 | 1270 | 0.978 |
| 66* | 0.30 | 0.70 | 2.00 | 2069 | 0.872 |
| 67* | 0.50 | 0.50 | 1.50 | 420 | 0.969 |
| 68* | 0.50 | 0.50 | 1.70 | 485 | 0.980 |
| 69 | 0.50 | 0.50 | 1.90 | 526 | 0.982 |
| 70 | 0.50 | 0.50 | 2.10 | 638 | 0.984 |
| 71 | 0.50 | 0.50 | 2.30 | 704 | 0.983 |
| 72* | 0.50 | 0.50 | 2.40 | 522 | 0.965 |
| 73* | 0.45 | 0.55 | 1.60 | 492 | 0.974 |
| 74 | 0.45 | 0.55 | 1.70 | 567 | 0.981 |
| 75 | 0.45 | 0.55 | 1.90 | 718 | 0.988 |
| 76 | 0.45 | 0.55 | 2.10 | 1009 | 0.992 |
| 77 | 0.45 | 0.55 | 2.30 | 771 | 0.991 |
| 78* | 0.45 | 0.55 | 2.40 | 654 | 0.978 |
| 79* | 0.40 | 0.60 | 1.50 | 559 | 0.976 |
| 80* | 0.40 | 0.60 | 1.60 | 582 | 0.979 |
| 81 | 0.40 | 0.60 | 1.70 | 673 | 0.989 |
| 82 | 0.40 | 0.60 | 1.90 | 892 | 0.997 |
| 83 | 0.40 | 0.60 | 2.10 | 1120 | 1.000 |
| 84 | 0.40 | 0.60 | 2.20 | 932 | 0.999 |
| 85 | 0.40 | 0.60 | 2.30 | 852 | 1.000 |
| 86* | 0.40 | 0.60 | 2.40 | 772 | 0.977 |
| 87* | 0.40 | 0.60 | 2.50 | 632 | 0.970 |
| 88* | 0.37 | 0.63 | 1.50 | 370 | 0.972 |
| 89* | 0.37 | 0.63 | 1.60 | 381 | 0.979 |
| 90 | 0.37 | 0.63 | 1.70 | 474 | 0.989 |
| 91 | 0.37 | 0.63 | 1.90 | 698 | 0.997 |
| 92 | 0.37 | 0.63 | 2.10 | 1017 | 1.000 |
| 93 | 0.37 | 0.63 | 2.20 | 724 | 0.999 |
| 94 | 0.37 | 0.63 | 2.30 | 657 | 1.000 |
| 95* | 0.37 | 0.63 | 2.40 | 575 | 0.979 |
| 96* | 0.37 | 0.63 | 2.50 | 439 | 0.971 |

TABLE 4

| Sample No. | La mol | Sr mol | Mn mol | $B_{25/50}$ K | $R^2$ |
|---|---|---|---|---|---|
| 101* | 0.40 | 0.60 | 1.00 | 1044 | 0.934 |
| 102* | 0.30 | 0.70 | 1.00 | 1166 | 0.949 |
| 103* | 0.20 | 0.80 | 1.00 | 1222 | 0.932 |

TABLE 5

| Sample No. | La mol | Ca mol | Mn mol | $B_{25/50}$ K | $R^2$ |
|---|---|---|---|---|---|
| 104* | 0.24 | 0.76 | 1.00 | 20 | 0.972 |
| 105* | 0.30 | 0.70 | 1.00 | 324 | 0.960 |
| 106* | 0.36 | 0.64 | 1.00 | 359 | 0.955 |
| 107* | 0.42 | 0.58 | 1.00 | 345 | 0.966 |
| 108* | 0.48 | 0.52 | 1.00 | 499 | 0.964 |
| 109* | 0.54 | 0.46 | 1.00 | 538 | 0.962 |

Samples of a number with an asterisk * in tables 1 to 5 are outside of the scope of this invention. The absolute values of $R^2$ for the samples which are outside of the scope of this invention, which were Nos. 1, 2, 19, 20, 29, 30, 38 through 40, 46, 47, 59, 65 through 68, 72, 73, 78 through 80, 86 through 89, 95, 96 and 101 through 109, were less than 0.98 indicating inferior linearity of resistance-temperature characteristic.

On the contrary, the absolute values of $R^2$ for the samples which are inside of the scope of this invention, which were Nos. 3 through 18, 21 through 28, 31 through 37, 41 through 45, 48 through 58, 60 through 64, 69 through 71, 74 through 77, 81 through 85, and 90 through 94; when the Ba content was in the range of 0.60 to 0.75 and the Mn content was 0.8 to 1.5 mol, and when the Ba content was in the range of 0.50 to 0.63 and the Mn content was 1.7 to 2.3 mol; were equal to or more than 0.98 indicating superior linearity of resistance-temperature characteristic.

Furthermore, the absolute values of $R^2$ for the samples Nos. 3 through 18, 24 through 27, 34 through 36, 43 and 44 which contained Ba in the range of 0.69 to 0.72 mol when the Mn content was 0.8 to 1.5 mol, and the Nos. 61 through 64, 76, 83 and 92 which contained Ba in the range of 0.54 to 0.63 when the Mn content was 2.0 to 2.1 mol, were equal to or more than 0.99 indicating a superior linearity of resistance-temperature characteristic. In addition, samples Nos. 3 through 18, 24 through 27, 34 through 36, 43, 44, 61 through 64, 76, 83 and 92 showed $B_{25/50}$ values equal to or greater than 970K and indicated increased sensitivity of resistance change by temperature change.

Figure 2:
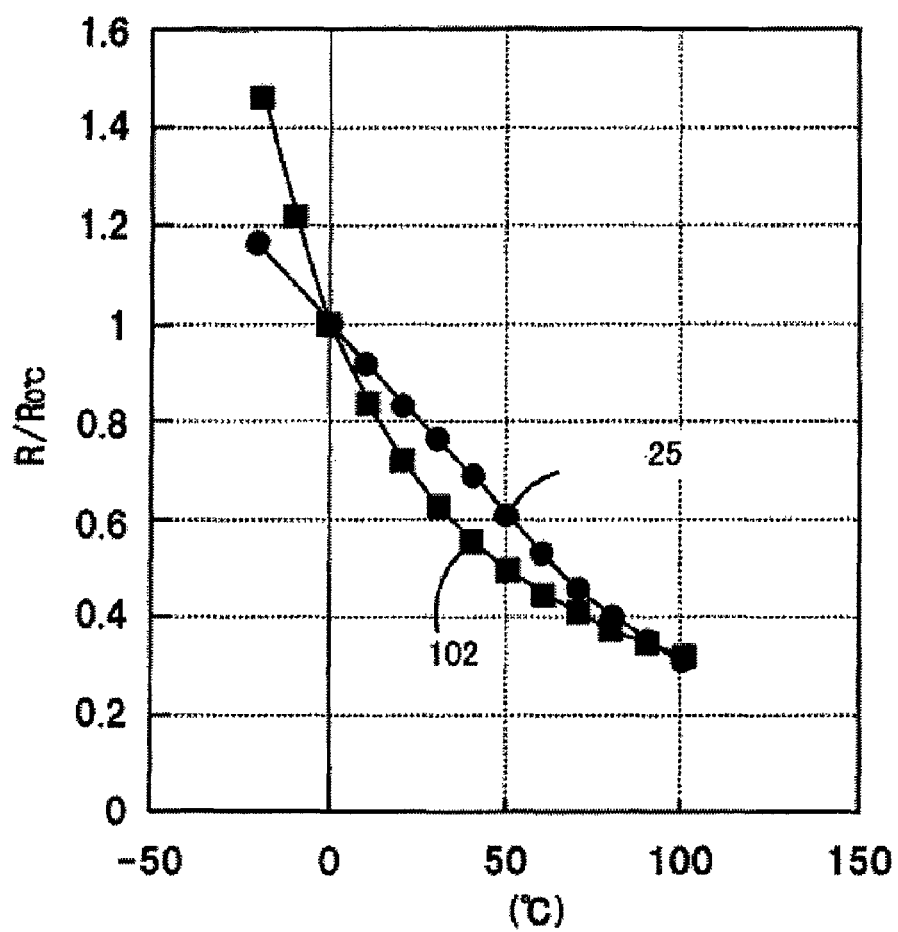
FIG. 2 is a graph showing an improvement effect for resistance-temperature characteristic of the NTC thermistor according to the present invention.

FIG. 2 shows the improvement effect of the present invention for the resistance-temperature characteristic of NTC thermistor, comparing the resistance-temperature characteristics of sample No. 25 which is inside of the scope of the present invention and sample No. 102 which is outside of the scope of the present invention. In FIG. 2, the vertical scale shows the values of the resistance value at each temperature divided by the resistance value at 0° C., and horizontal scale shows temperature. As is obvious from FIG. 2, the linearity of the resistance-temperature characteristic was improved substantially with sample No. 25 which is inside of the scope of the present invention compared to sample 102 which is outside of the scope of the present invention.

The invention claimed is:

1. A semi-conductive ceramic material comprising:
    an oxide having a negative resistance-temperature characteristic which is expressed by general formula $AB_yO_z$, wherein A comprises a rare earth element and barium, B comprises manganese, and the content of barium in A is 60 to 75 mol % when y=0.8 to 1.5, and 50 to 63 mol % when y=1.7 to 2.3, and z is a value which maintains the electric neutrality of the oxide.

2. A semi-conductive ceramic material according to claim 1, wherein the content of barium in A is 69 to 72 mol % when y=0.8 to 1.5, and 54 to 63 mol % when y=2.0 to 2.1.

3. A semi-conductive ceramic material according to claim 2, wherein the oxide is expressed by formula $(La_{1-\alpha}Ba_\alpha)Mn_yO_z$, 1-α is 0.25 to 0.5, and y is 0.8 to 1.6.

4. A semi-conductive ceramic material according to claim 2, wherein the oxide is expressed by formula $(La_{1-\alpha}Ba_\alpha)Mn_yO_z$ in which y is a value of 0.8-1.5 or 1.7-2.3, and $0.60 \leq \alpha \leq 0.75$ when y=0.8 to 1.5, and $0.50 \leq \alpha \leq 0.63$ when y=1.7 to 2.3.

5. An NTC thermistor comprising a ceramic body and electrodes facing each other and sandwiching at least a part of the ceramic body, wherein the ceramic body is a semi-conductive ceramic material according to claim 4.

6. An NTC thermistor comprising a ceramic body and electrodes facing each other and sandwiching at least a part of the ceramic body, wherein the ceramic body is a semi-conductive ceramic material according to claim 3.

7. An NTC thermistor comprising a ceramic body and electrodes facing each other and sandwiching at least a part of the ceramic body, wherein the ceramic body is a semi-conductive ceramic material according to claim 2.

8. An NTC thermistor comprising a ceramic body and electrodes facing each other and sandwiching at least a part of the ceramic body, wherein the ceramic body is a semi-conductive ceramic material according to claim 1.

* * * * *